United States Patent Office 2,850,041
Patented Sept. 2, 1958

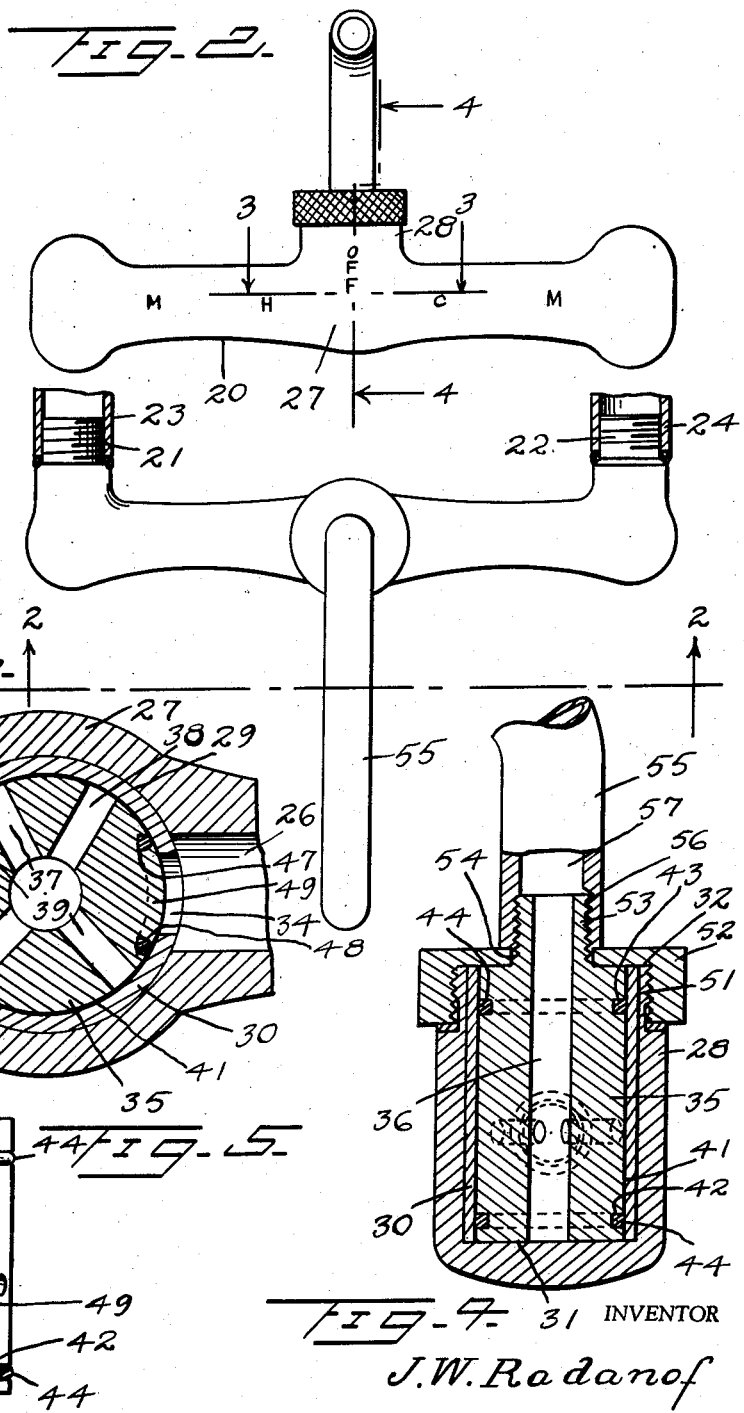

2,850,041

MIXING FAUCET VALVE

Joseph W. Radanof, Merced, Calif.

Application September 6, 1955, Serial No. 532,420

1 Claim. (Cl. 137—625.41)

The present invention relates to mixing faucet valves, and more particularly to a valve of this type which will not only control the relative flow of hot and cold water but will also control the total flow therethrough.

The primary object of the invention is to provide a structure to control the flow of hot and cold water through a single spout with the same structure acting to mix the hot and cold water and control the total flow thereof.

Another object of the invention is to provide a structure of the class described in which a single rotary element is provided to control the fluid flow therethrough.

A further object of the invention is to provide a structure of the class described in which the valve operator is combined with the faucet spout.

A still further object of the invention is to provide a structure of the class described in which the water pressures acting on the rotary plug are balanced.

And still another object of the invention is to provide a structure of the class described wherein a single cap member completely secures the operating portions of the valve together.

Other objects and advantages will become apparent in the following specification when considered in the light of the attached drawings, in which:

Figure 1 is a top plan view of the invention showing it attached to hot and cold water lines, partly broken away for clarity;

Figure 2 is a front elevation of the invention with the spout shown in vertical cross-section, taken on the line 2—2 of Figure 1, looking in the direction of the arrows;

Figure 3 is an enlarged horizontal cross-section partly broken away, taken along the line 3—3 of Figure 2, looking in the direction of the arrows;

Figure 4 is an enlarged transverse vertical cross-section, taken along the line 4—4 of Figure 2, looking in the direction of the arrows;

Figure 5 is an enlarged side elevation of the valve plug, partly broken away and in section.

Referring now to the drawings in detail wherein like reference numerals indicate like parts throughout the several figures, the reference numeral 20 indicates generally a faucet body having parallelly extending threaded nipple portions 21 and 22 which are secured respectively to a hot water pipe 23 and a cold water pipe 24, which are connected to the usual piping system (not shown) of a building.

The faucet body 20 is hollow, forming a hot water conduit 25 and a cold water conduit 26 leading to the central portion 27 thereof. The central portion 27 is formed substantially cylindrical on a vertical axis and extends at 28 above the main portions of the body 20. The central portion 27 is provided with a cylindrical bore 29 which extends through the top of the portion 28, extending above the main body portion 20, the bore 29 being in communication with the conduits 25 and 26. A cylindrical sleeve 30 is pressed into the bore 29 with a sufficiently close fit to prevent water flow between the outer surface of the sleeve 30 and the inner surface of the bore 29. The sleeve 30 extends from the bottom 31 of the bore 29 to the top edge 32 of the bore 29. The sleeve 30 is provided with a pair of diametrically opposed ports 33 and 34 which are positioned centrally of the conduits 25 and 26 and communicate the interior of the sleeve 30 with the conduits 25 and 26. A cylindrical plug 35 is positioned within the sleeve 30 and is provided with a vertically extending axial bore 36 which continues through both ends of the plug 35.

A plurality of transverse bores 37, 38, 39 and 40 extend from the central bore 36 outwardly through the side wall 41 of the plug 35, the radial bores 37 and 39 being arranged at an angle to each other of approximately 166° and the bores 38 and 40 being arranged at a similar angle to each other. Bores 37 and 38 are positioned at an angle of approximately 59° to each other, and the bores 39 and 40 are positioned at an angle of approximately 87° to each other. The plug 35 has a circumferential groove 42 adjacent the bottom edge thereof and is provided with a second circumferential groove 43 adjacent the top edge thereof. The grooves 42 and 43 are provided with a continuous resilient sealing ring 44 each of which are in engagement with the internal face of the sleeve 30 and seal the upper and lower ends of the plug 35 to the sleeves 30 to prevent water flow beyond the ends of the plug 35.

Between the bores 37 and 40 a circular groove 45 is formed in the side wall 41 of the plug 35. The groove 45 is formed with its axis lying in the same plane as the axis of the bores 37 and 40. A sealing O ring 46 is seated in the groove 45 and bears against the inner face of the sleeve 30 about the port 33 when the valve plug 35 is positioned in closed position, as illustrated in Figure 3. The second circular groove 47 is formed diametrically opposite to the circular groove 45 in the side wall 41 of the plug 35 and contains a sealing O ring 48 to seal the port 34 when the plug 35 is in closed position.

The upper end 51 of the portion 28 is externally threaded and is adapted to receive an internally threaded cap 52 in threaded engagement therewith. An externally threaded hollow boss 53 projects upwardly from the top of the plug 35 and extends through an axial bore 54 in the cap 52. The cap 52 engages the top of the plug 35 to retain the plug 35 within the sleeve 30. A spout 55 is internally screw-threaded as at 56 and threadedly engages over the screw-threaded boss 53. The spout 55 is hollow, as at 57, and is adapted to conduct water flowing to the bore 36 to the consumer. The spout 55 is secured by the internal threads 56 to the threaded boss 53 sufficiently tight so that relative rotation therebetween, as well as leakage therebetween, will not occur and the rotation of the spout 55 will rotate the plug 35 in the sleeve 30.

In the use and operation of the inventon, illustrated in Figures 1 through 5, the spout 55 may be rotated in either a clockwise or counterclockwise direction, referring to Figure 1. When the rotation of the spout 55 is counter-clockwise, the bore 39 is brought into registry with the port 34 so that cold water can flow from the pipe 24 through the bore 26, the port 34, the bore 39, the bore 36 and the spout 55. It should be obvious that as the spout 55 is rotated, the bore 39 will gradually align with the port 34 so that the flow of water will be gradually increased to a maximum, occurring when the bore 39 is completely aligned with the port 34. Further rotation in a counterclockwise direction will align the bore 37 with the port 33 so that hot water from the pipe 23 can flow through the conduit 25, the port 33, the bore 37, and mix with the cold water in the bore 36. Obviously the amount of hot water flowing through the bore 37 is controlled by the percentage of alignment of the bore 37 with the port 33 until the bore 37 becomes fully aligned with the port 33.

At this point the bores 37 and 39 are aligned with their respective ports 33 and 34 and an equal quantity of hot and cold water will flow through the spout 55. Further rotation in this direction will move the bore 39 out of alignment with the port 34 to gradually shut off the supply of cold water flowing to the bore 36. Upon the shutting off of the supply of cold water, the hot water will continue to flow the maximum rate since the bore 37 will still be in alignment with the port 33.

Rotation of the plug 35 in a clockwise direction will align the bore 40 with the port 33 so that the initial movement of the plug 35 will cause hot water to flow from the spout 55 and further movement will align the bore 38 with the port 34 to provide a mixed water supply to the spout 55 and further movement in this direction will cause the bore 40 to move out of alignment with the port 33, with the bore 38 remaining in alignment with the port 34 so as to provide a supply of cold water at this point.

It should be obvious that rotation of the spout 55 from its center off position, as illustrated in Figures 1, 2 and 3, through a quadrant of 90° in either direction will provide a controlled flow of hot and cold water, a full flow of hot and cold water, and a mixed flow of hot and cold water in each direction with the sequence of each reversed.

The use of the double quadrant plug 35 permits a controlled flow of hot or cold water to be obtained without the necessity of rotating the spout 55 more than a few degrees in each direction from off position. In dual compartment sinks the spout 55 can provide a complete control of the water flow into each compartment without additional valves being required.

Having thus described the preferred embodiment of the invention, it should be understood that numerous modifications and structural adaptations may be resorted to without departing from the scope of the appended claim.

What is claimed is:

A mixing faucet valve comprising a hollow body member having a cylindrical side wall, an end wall integrally joined to and closing one end of said body member, with the other end of said body member externally screw-threaded, a cap internally screw-threaded cooperating with the external screw threads on said body member to close the other end of said body member, a cylindrical plug valve rotatably carried in said body member and retained therein by said cap, said plug having an axial bore extending therethrough, said plug having a pair of radially extending bores on one side thereof and a second pair of radial bores on the opposite side thereof with each of said radial bores having their axes lying in a plane extending at right angles to the axis of said valve and with said radial bores each extending through the side of said valve at one end and communicating with said axial bore at the other end, said radial bores each having its axis extending at an angle to the axis of each of the other bores in said valve, said body member having a pair of diametrically opposed aligned hot and cold water inlet ports extending through the cylindrical wall thereof with the axes of said ports lying in the same plane containing the axes of said radial bores, said ports having a diameter substantially greater than the diameter of said radial bores, and a combined spout conduit and handle means secured to said valve plug for effecting rotation thereof and extending from said valve whereby water passing through said ports, said radial bores and said axial bore may be dispensed from said valve, said plug being rotatably adjustable to align a selected bore of said first pair of bores with one of said inlet ports, upon further adjustment to align a selected bore of said second pair of bores with the other of said inlet ports and to align both of said selected bores with the respective one of said inlet ports at another position of adjustment.

References Cited in the file of this patent

UNITED STATES PATENTS

| | | |
|---|---|---|
| 1,145,271 | Scanlan | July 6, 1915 |
| 1,478,227 | Hoffman | Dec. 18, 1923 |
| 1,642,623 | Niven | Sept. 13, 1927 |
| 1,842,894 | Breegle | Jan. 26, 1932 |
| 2,042,186 | Peterson | May 26, 1939 |
| 2,335,085 | Roberts | Nov. 23, 1943 |
| 2,510,514 | Mueller | June 6, 1950 |

FOREIGN PATENTS

| | | |
|---|---|---|
| 1,038,027 | France | of 1953 |